United States Patent
Huang

(10) Patent No.: US 9,569,162 B2
(45) Date of Patent: Feb. 14, 2017

(54) MULTI-DISPLAYER SCROLLING DISPLAY METHOD, DEVICE AND PROCESSING TERMINAL IN TELEPRESENCE SYSTEM

(71) Applicant: ZTE Corporation, Shenzhen, Guangdong (CN)

(72) Inventor: Zhihong Huang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/439,914

(22) PCT Filed: Oct. 30, 2013

(86) PCT No.: PCT/CN2013/086254
§ 371 (c)(1),
(2) Date: May 27, 2015

(87) PCT Pub. No.: WO2014/067464
PCT Pub. Date: May 8, 2014

(65) Prior Publication Data
US 2015/0277842 A1    Oct. 1, 2015

(30) Foreign Application Priority Data
Oct. 30, 2012    (CN) .......................... 2012 1 0424182

(51) Int. Cl.
*H04N 7/14* (2006.01)
*G06F 3/14* (2006.01)
(Continued)

(52) U.S. Cl.
CPC ............ *G06F 3/1446* (2013.01); *H04N 5/445* (2013.01); *H04N 7/15* (2013.01); *H04N 7/152* (2013.01); *H04N 21/4856* (2013.01)

(58) Field of Classification Search
CPC ......... G06F 3/1446; H04N 7/15; H04N 5/445; H04N 21/4856; H04N 7/152
See application file for complete search history.

(56) References Cited

U.S. PATENT DOCUMENTS

| | | |
|---|---|---|
| 2010/0073454 A1 | 3/2010 | Lovhaugen |
| 2010/0156854 A1* | 6/2010 | Fisher ................... G06F 3/1446 |
| | | 345/204 |

(Continued)

FOREIGN PATENT DOCUMENTS

| | | |
|---|---|---|
| CN | 101710961 A | 5/2010 |
| CN | 102006453 A | 4/2011 |

(Continued)

OTHER PUBLICATIONS

International Search Report in international application No. PCT/CN2013/086254, mailed on Feb. 20, 2014.

(Continued)

*Primary Examiner* — Stella Woo
(74) *Attorney, Agent, or Firm* — Oppedahl Patent Law Firm LLC

(57) ABSTRACT

Provided is a multi-displayer scrolling display method in a telepresence system, including that when a content needing scrolling display is received, display positions and display contents of the content needing scrolling display in respective displayers are determined according to an arrangement manner, an output size and a scrolling display manner of the displayers of the telepresence system; the content needing scrolling display is subjected to weighed stacking respectively with originally to-be-displayed decoded outputted contents of the respective displayers, and the contents subjected to the weighed stacking are outputted as current frames of the respective displayers. A multi-displayer scrolling display device and a processing terminal in a telepresence system are also provided. A caption or an image can be (Continued)

displayed on a plurality of separately arranged displayers in a scrolling manner, thus enabling a use to have a better on-the-scene feeling by means of such a telepresence system, and improving user experience.

10 Claims, 2 Drawing Sheets

(51) Int. Cl.
    *H04N 7/15*     (2006.01)
    *H04N 21/485*     (2011.01)
    *H04N 5/445*     (2011.01)

(56) References Cited

U.S. PATENT DOCUMENTS

2013/0088563 A1      4/2013    Wu

2013/0100348 A1*    4/2013    Chen .................... H04N 7/0885
                                                                   348/468

FOREIGN PATENT DOCUMENTS

| CN | 102333201 A | 1/2012 | |
|---|---|---|---|
| CN | WO 2012006919 A1 * | 1/2012 | ........... H04N 7/0885 |
| CN | 102419742 A | 4/2012 | |
| CN | 102572370 A | 7/2012 | |
| EP | 2563017 A1 | 2/2013 | |

OTHER PUBLICATIONS

English Translation of the Written Opinion of the International Search Authority in international application No. PCT/CN2013/086254, mailed on Feb. 20, 2014.

Supplementary European Search Report in European application No. 13850846.0, mailed on Sep. 1, 2015.

* cited by examiner

MULTI-DISPLAYER SCROLLING DISPLAY METHOD, DEVICE AND PROCESSING TERMINAL IN TELEPRESENCE SYSTEM

TECHNICAL FIELD

The disclosure relates to a multi-displayer scrolling display technology, particularly to a multi-displayer scrolling display method, device and processing terminal in a telepresence system.

BACKGROUND

With the development of conference systems, people are no longer satisfied with basic communication of conference contents, and pursue comfort and on-the-scene feelings in communications. A telepresence conference system developed for such a demand, e.g. a telepresence system, which is an immersive virtual conference technology, is able to provide a good on-the-scene feeling for a conferee, including a life size, an eye contact and location identification by voice, and so on, thus creating a face-to-face feeling between two communicating parties. A life-size image can be hardly provided by one camera plus a conference terminal display in each conference place according to the prior art. Therefore, for a current telepresence system, a plurality of cameras are generally arranged in each conference place and support simultaneous display of a plurality of video streams. FIG. 1 is a schematic diagram of an arrangement of a telepresence conference place with three displays, including three displays 101 arranged side by side, telepresence desks 102 and telepresence chairs 103 provided opposite to the displays 101, and so on. Life-size display and an on-the-scene perspective can be achieved through the arrangement, thus providing voices and images which are more realistic with more on-the-scene feelings. Since a terminal is assorted with a display in a certain conference place of a common conference system, all original scrolling captions can be displayed on one display in a scrolling manner. When a telepresence conference place is provided with a plurality of displays, an original solution can only control a scrolling caption or an image to be presented on a certain screen, which is not user-friendly. Better user experience will be achieved if a caption or an image can scroll on a plurality of displays with a scrolling effect that the plurality of displays are integrated as a whole.

SUMMARY

In view of this, a main purpose of the disclosure is to provide a multi-displayer scrolling display method, device and processing terminal in a telepresence system, so as to display a caption or an image on a plurality of separately arranged displays in a scrolling manner, thus enabling a telepresence system to provide a better on-the-scene feeling for a user, and improving user experience.

To achieve the purpose above, technical solutions of the disclosure are implemented by the following way.

A multi-displayer scrolling display method in a telepresence system includes that when a content needing scrolling display is received, display positions and display contents of the content needing scrolling display in respective displays are determined according to an arrangement manner, an output size and a scrolling display manner of the displays of the telepresence system; and the content needing scrolling display is subjected to weighed stacking respectively with originally to-be-displayed decoded outputted contents of the respective displays, and respective contents subjected to the weighed stacking are outputted as current frames of the respective displays.

Preferably, after outputting the current frames, the method may further include that:

whether display expires or scrolling display is cancelled is determined; when it is time to terminate current processing, display has not expired and scrolling display has not been cancelled, display positions and display contents of the content needing scrolling display in next frames of the respective displays are determined according to the arrangement manner, the output size and the scrolling display manner of the displays of the telepresence system; the content needing scrolling display is subjected to weighed stacking respectively with originally to-be-displayed decoded outputted contents of the next frames of the respective displays, and respective contents subjected to the weighed stacking are outputted as the next frames of the respective displays.

Preferably, before subjecting the content needing scrolling display to weighed stacking respectively with the originally to-be-displayed decoded and outputted contents of the respective displays, the method may further include that:

the content needing scrolling display is converted into content having a lattice structure.

Preferably, the content needing scrolling display may include a caption, and/or an image.

A multi-displayer scrolling display device in a telepresence system includes a receiving unit, a first determining unit, a stacking unit and an output unit, wherein the receiving unit is configured to receive a content needing scrolling display;

the first determining unit is configured to determine display positions and display contents of the content needing scrolling display in respective displays according to an arrangement manner, an output size and a scrolling display manner of the displays of the telepresence system; and the stacking unit is configured to subject the content needing scrolling display in the respective displays to weighed stacking respectively with originally to-be-displayed decoded and outputted contents of the respective displays; and the output unit is configured to output contents subjected to the weighed stacking as current frames of the respective displays.

Preferably, the device may further include a second determining unit configured to determine, after the current frames are outputted, whether display expires or scrolling display is cancelled, and when it is time to terminate current processing, display has not expired and scrolling display has not been cancelled, to trigger the first determining unit to determine display positions and display contents of the content needing scrolling display in next frames of the respective displays according to the arrangement manner, the output size and the scrolling display manner of the displays of the telepresence system; and the stacking unit is configured to subject the content needing scrolling display in the next frames to weighed stacking respectively with originally to-be-displayed decoded and outputted contents of the next frames of the respective displays, and the output unit is configured to output respective contents subjected to the weighed stacking as the next frames of the respective displays.

Preferably, the device may further include a converting unit, configured to convert the content needing scrolling display into content having a lattice structure before subjecting the content needing scrolling display to weighed stacking respectively with the originally to-be-displayed decoded and outputted contents of the respective displays.

Preferably, the content needing scrolling display may include a caption, and/or an image.

A processing terminal of a telepresence system includes the multi-displayer scrolling display device in the telepresence system.

In the disclosure, when a content needing scrolling display is received, display positions and display contents of the content needing scrolling display in respective displays are determined according to an arrangement manner, an output size and a scrolling display manner of the displays of a telepresence system; the content needing scrolling display is subjected to weighed stacking respectively with originally to-be-displayed decoded outputted contents of the respective displays, and respective contents subjected to the weighed stacking are outputted as current frames of the respective displays; whether display expires or scrolling display is cancelled is determined; when it is time to terminate current processing, display has not expired and scrolling display has not been cancelled, display positions and display contents of the content needing scrolling display in next frames of the respective displays are determined according to the arrangement manner, the output size and the scrolling display manner of the displays of the telepresence system; the content needing scrolling display in the next frames is respectively subjected to weighed stacking with originally to-be-displayed decoded outputted contents of the next frames of the respective displays, and respective contents subjected to the weighed stacking are outputted as the next frames of the respective displays. The disclosure can display in a scrolling manner a caption or an image on a plurality of separately arranged displays, thus enabling a user to have a better on-the-scene feeling by means of such a telepresence system, and improving user experience.

DETAILED DESCRIPTION

The basic idea of the disclosure is that when a content needing scrolling display is received, display positions and display contents of the content needing scrolling display in respective displays are determined according to an arrangement manner, an output size and a scrolling display manner of the displays of a telepresence system; the content needing scrolling display is subjected to weighed stacking respectively with originally to-be-displayed decoded outputted contents of the respective displays, and respective contents subjected to the weighed stacking are outputted as current frames of the respective displays; whether display expires or scrolling display is cancelled is determined; when it is time to terminate current processing, display has not expired and scrolling display has not been cancelled, display positions and display contents of the content needing scrolling display in next frames of the respective displays are determined according to the arrangement manner, the output size and the scrolling display manner of the displays of the telepresence system; the content needing scrolling display is respectively subjected to weighed stacking with originally to-be-displayed decoded outputted contents of the next frames of the respective displays, and respective contents subjected to the weighed stacking are outputted as the next frames of the respective displays.

To make the purposes, technical solutions and advantages of the disclosure clearer, the disclosure will be further expounded by illustrating embodiments and with reference to the accompanying drawings.

Figure 2:
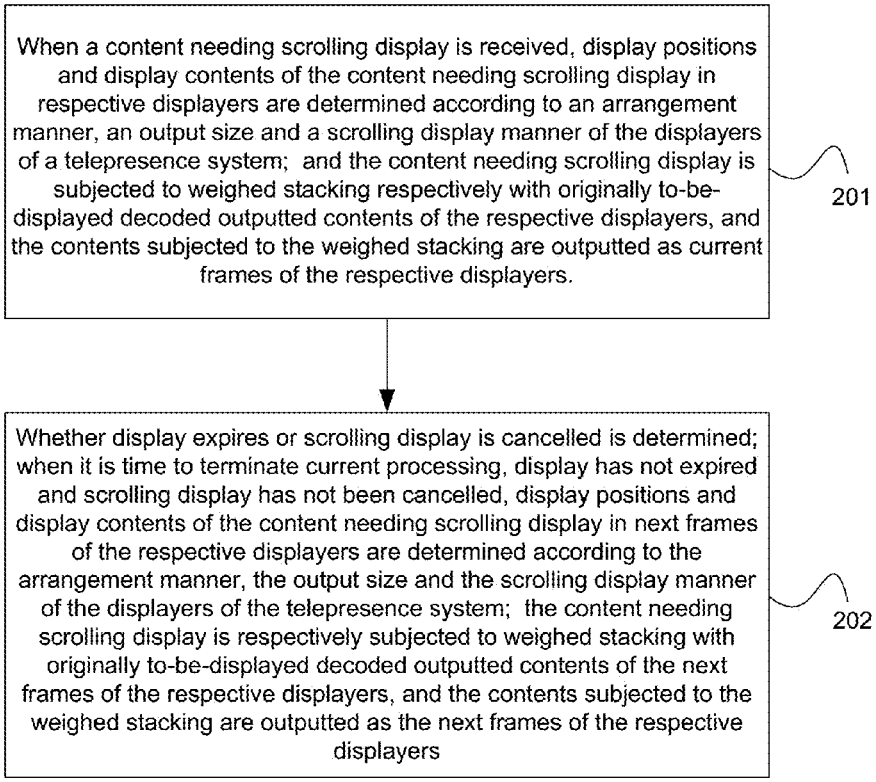
FIG. 2 is a flowchart of a multi-displayer scrolling display method in a telepresence system according to an embodiment of the disclosure.

FIG. 2 is a flowchart of a multi-displayer scrolling display method in a telepresence system according to an embodiment of the disclosure. As shown in FIG. 2, the multi-displayer scrolling display method in the telepresence system according to the present example includes the following steps.

Step 201 includes that when a content needing scrolling display is received, display positions and display contents of the content needing scrolling display in respective displays are determined according to an arrangement manner, an output size and a scrolling display manner of the displays of a telepresence system; and the content needing scrolling display is subjected to weighed stacking respectively with originally to-be-displayed decoded outputted contents of the respective displays, and respective contents subjected to the weighed stacking are outputted as current frames of the respective displays.

A caption to be displayed is configured through a remote configuration interface (e.g. a web, or a console or a remote control, and so on) of the telepresence system, e.g. the caption may be "please have group discussions after the conference". Parameters including a scrolling speed and a scrolling direction of display are configured. A method of scrolling from left to right is applied in the present example. In the disclosure, the so-called caption is a text displayed as a lattice. Of course, a common text may be also displayed directly if required, but the on-the-scene effect will be modest.

A scrolling caption message is sent to each conference place according to user configuration and a trigger method of the telepresence system itself.

After receiving the scrolling caption message, a processing terminal of a current conference place parses the scrolling caption message in a memory into an exact lattice image that needs to be superimposed (or stacked) with a content currently outputted and displayed by a display. A specific method is that a lattice word library preset by the processing terminal parses a scrolling caption into a linear code stream that can be outputted and displayed directly.

In the disclosure, a display content including an image etc. may be also displayed in a scrolling manner according to completely the same processing method of the scrolling caption, and an example of display an image in a scrolling manner will not be illustrated here.

Figure 1:
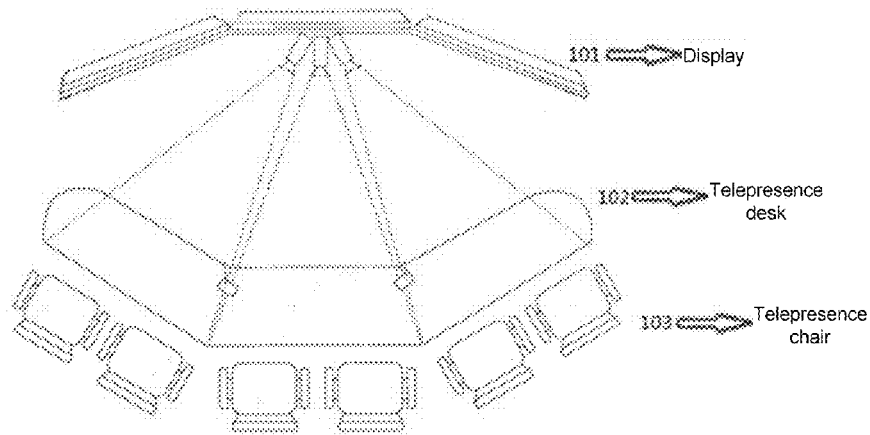
FIG. 1 is a schematic diagram of an arrangement of a telepresence conference place with three displays.

Current arrangement positions of displays and sizes of windows of the displays of the telepresence system are virtualized in the memory of the processing terminal. In the disclosure, the telepresence system is provided with a plurality of displays. Generally, these displays are all arranged linearly in a single layer as shown in FIG. 1. Of course, a multi-layer arrangement method is also supported by a technical solution of the disclosure and its implementing principle is almost the same as that of an implementation method of single-layer linear arrangement, the only difference lies in a slightly different method for computing a display frame. Therefore, the disclosure provides illustration by only taking the number of the displayers and the arrangement manner thereof of the telepresence system as shown in FIG. 1 as an example.

In the disclosure, parameters including the arrangement manner, and a display size, and so on of the displayers may be inputted into the memory of the processing terminal and served as configuration parameters in order to improve the efficiency of scrolling display, and the processing terminal only needs to invoke the configuration parameters directly when it is needed to use these parameters. Of course, it can be that only basic parameters, e.g. sizes of the displayers, and arrangement orders among the respective displayers and so on are inputted, so that the processing terminal computes related display parameters according to these configuration parameters.

Figure 3:
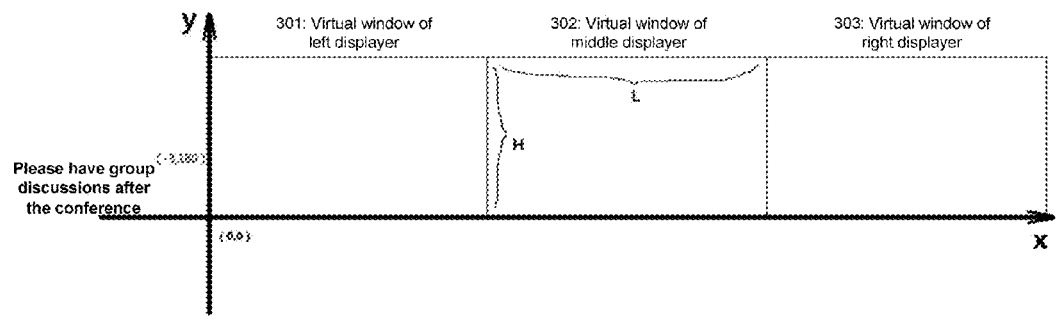
FIG. 3 is a schematic diagram of determining display positions and display contents needing scrolling display of a plurality of displays according to an embodiment of the disclosure.
Figure 4:
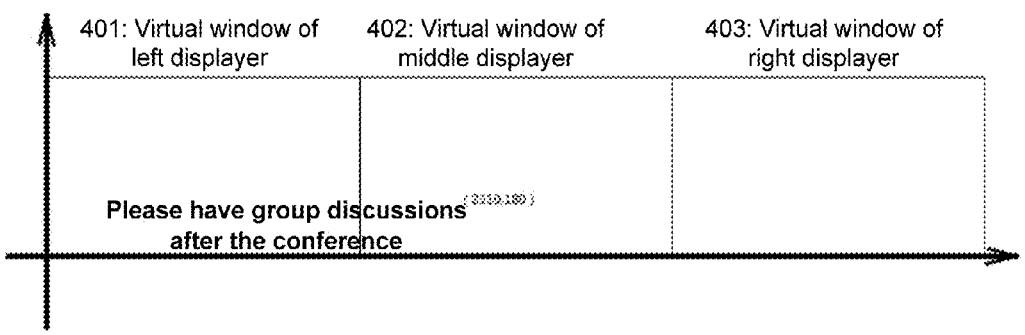
FIG. 4 is a schematic diagram of determining display positions and display contents needing scrolling display of a plurality of displays according to an embodiment of the disclosure.

FIG. 3 and FIG. 4 show a method for computing current display positions and display contents of the scrolling captions in the respective displayers in real time at a current moment, that is, a coordinate system is virtualized, positions of the respective displayers in the coordinate system are computed, and a display position of each word in the caption needing scrolling display in a current frame is determined according to the size of the caption to be displayed and a display position of the caption in a displayer. As shown in FIG. 3 and FIG. 4, display positions of current frames of the scrolling caption on the respective displayers and display contents on the respective displayers may be determined easily when parameters including the arrangement orders of the respective displayers, lengths and widths of the displayers themselves, the size and the scrolling direction of the scrolling caption, and so on are determined. The details of the determination process will not be described repeatedly in the disclosure.

In the present example, a method for scrolling display is scrolling display from left to right, and is not limited by the disclosure. For example, the method for scrolling display may be also scrolling display from right to left. Of course, if a display system consists of displayers linearly arranged in two or more layers, a scrolling caption may be hierarchically displayed separately, or may be hierarchically displayed jointly. Since these display methods may be implemented through specific arithmetical operations and there are many display methods, it is impossible for the disclosure to describe them one by one.

The Caption to be displayed on corresponding areas of three displayers are outputted after being subjected to weighed stacking with linear code streams parsed out by a decoder of the respective displayers. That is, display positions and display contents of the caption needing scrolling display on the respective displayers are subjected to weighed stacking with originally to-be-displayed decoded outputted contents of the respective displayers, and the contents subjected to the weighed stacking are outputted as current frames of the respective displayers.

Step 202 includes that whether display expires or scrolling display is cancelled is determined; when it is time to terminate current processing, display has not expired and scrolling display has not been cancelled, display positions and display contents of the content needing scrolling display in next frames of the respective displayers are determined according to the arrangement manner, the output size and the scrolling display manner of the displayers of the telepresence system; the content needing scrolling display is respectively subjected to weighed stacking with originally to-be-displayed decoded outputted contents of the next frames of the respective displayers, and the contents subjected to the weighed stacking are outputted as the next frames of the respective displayers.

In the disclosure, after a current frame is outputted, it is necessary to determine whether a caption currently displayed in a scrolling manner expires, or whether display has been cancelled by a user. A current processing is terminated when display of the caption displayed in a scrolling manner expires or the display has been cancelled by the user. However, when scrolling display has not expired or the scrolling display has not been cancelled, display positions and display contents of the scrolling caption of next frames on the respective displayers need to be determined according to the speed of scrolling display, and are subjected to weighed stacking with originally to-be-displayed decoded outputted contents (contents displayed on backgrounds of the respective displayers may have not been changed) of the next frames of the respective displayers, and the contents subjected to the weighed stacking are outputted as the next frames of the respective displayers.

In addition, after the determined next frames are output and displayed as current frames, Step 202 is repeated until the scrolling display is cancelled or expires.

Figure 5:
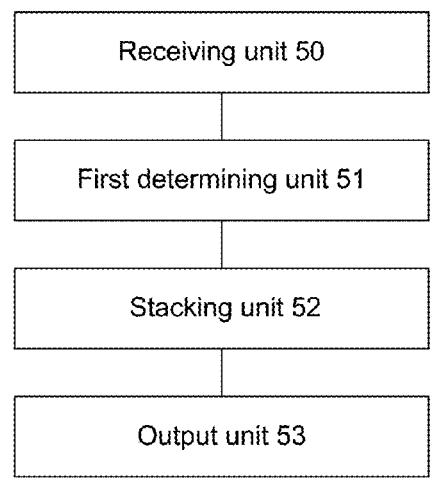
FIG. 5 is a structural diagram of components of a multi-displayer scrolling display device in a telepresence system according to an embodiment of the disclosure.

FIG. 5 is a structural diagram of components of a multi-displayer scrolling display device in a telepresence system according to an embodiment of the disclosure. As shown in FIG. 5, the multi-displayer scrolling display device in the telepresence system according to the present example includes a receiving unit 50, a first determining unit 51, a stacking unit 52 and an output unit 53, wherein the receiving unit 50 is configured to receive a content needing scrolling display;

the first determining unit 51 is configured to determine display positions and display contents of the content needing scrolling display in respective displayers according to an arrangement manner, an output size and a scrolling display manner of the displayers of the telepresence system. A method for determining the display positions and the display contents of the content needing scrolling display in the respective displayers may refer to the determining methods as shown in FIG. 3 and FIG. 4;

the stacking unit 52 is configured to subject the content needing scrolling display in the respective displayers to weighed stacking respectively with originally to-be-displayed decoded and outputted contents of the respective displayers; and the output unit 53 is configured to output the contents subjected to the weighed stacking as current frames of the respective displayers.

Based on the multi-displayer scrolling display device in the telepresence system as shown in FIG. 5, the multi-displayer scrolling display device in the telepresence system of the disclosure further includes a second determining unit (not shown in FIG. 5) configured to determine, after the current frames are outputted, whether display expires or scrolling display is cancelled, and when it is time to terminate current processing, display has not expired and scrolling display has not been cancelled, to trigger the first determining unit 51 to determine according to the arrangement manner, the output size and the scrolling display manner of the displayers of the telepresence system, display positions and display contents of the content needing scrolling display in next frames of the respective displayers.

The stacking unit 52 is configured to subject the content needing scrolling display in the next frames of the respective displayers to respectively weighed stacking with originally to-be-displayed decoded and outputted contents of the next frames of the respective displayers, and the output unit 53 is configured to output the contents subjected to the weighed stacking as the next frames of the respective displayers.

Based on the multi-displayer scrolling display device in the telepresence system as shown in FIG. 5, the multi-displayer scrolling display device in the telepresence system of the disclosure may further include a converting unit (not shown in the FIG. 5), configured to convert the content needing scrolling display into content having a lattice structure before the content needing scrolling display is subjected to the weighed stacking respectively with the originally to-be-displayed decoded and outputted contents of the respective displayers.

The content needing scrolling display includes a caption, and/or an image.

In the present embodiment, the receiving unit and the output unit may be implemented by a touch screen, or a data interface and so on having an input and output function. The determining unit and the stacking unit may be implemented by a processor, e.g. a Central Processing Unit (CPU), a microprocessor and etc.

Those skilled in the art should understand that functions implemented by each processing unit in the multi-displayer scrolling display device in the telepresence system as shown in FIG. 5 may be understood with reference to related description of the multi-displayer scrolling display method in the telepresence system. Those skilled in the art should understand that functions of each processing unit in the multi-displayer scrolling display device in the telepresence system as shown in FIG. 5 may be implemented through a program running on a processor, or may be implemented through a specific logical circuit.

The disclosure further describes a processing terminal of a telepresence system, including the multi-displayer scrolling display device in the telepresence system as shown in FIG. 5.

Evidently, those skilled in the art shall understand that the respective modules or steps of the disclosure may be implemented by a general-purpose computing device and may be integrated into a single computing device or distributed over a network consisting of a plurality of computing devices. Optionally, they may be implemented using program codes executable by a computing device so that they may be stored in a storage device and executed by the computing device, or they may be implemented by being fabricated into respective integrated circuit modules or implemented by fabricating a plurality of modules or steps of them into a single integrated circuit module. Thus, the disclosure is not limited to any specific combination of hardware and software.

The foregoing descriptions are only preferred embodiments of the disclosure and are not used for limiting the protection scope of the disclosure.

INDUSTRIAL APPLICABILITY

In the technical solutions of the embodiments of the disclosure, when a content needing scrolling display is received, display positions and display contents of the content needing scrolling display in respective displayers are determined according to an arrangement manner, an output size and a scrolling display manner of the displayers of a telepresence system; the content needing scrolling display is subjected to weighed stacking respectively with originally to-be-displayed decoded outputted contents of the respective displayers, and the contents subjected to the weighed stacking are outputted as current frames of the respective displayers; whether display expires or scrolling display is cancelled is determined; when it is time to terminate current processing, display has not expired and scrolling display has not been cancelled, display positions and display contents of the content needing scrolling display in next frames of the respective displayers are determined according to the arrangement manner, the output size and the scrolling display manner of the displayers of the telepresence system; the content needing scrolling display is respectively subjected to weighed stacking with originally to-be-displayed decoded outputted contents of the next frames of the respective displayers, and the contents subjected to the weighed stacking are outputted as the next frames of the respective displayers. A caption or an image can be displayed on a plurality of separately arranged displayers in a scrolling manner, thus enabling a user to have a better on-the-scene feeling by means of such a telepresence system, and improving user experience.

The invention claimed is:

1. A multi-displayer scrolling display method in a telepresence system, comprising:
   when a content needing scrolling display is received, determining display positions and display contents of the content needing scrolling display in respective displayers according to an arrangement manner of the displayers of the telepresence system, an output size of the respective displayers of the telepresence system and a scrolling display manner of the content needing scrolling display;
   subjecting the content needing scrolling display in the respective displayers to weighted superimposing respectively with originally to-be-displayed decoded outputted contents of the respective displayers;
   outputing respective contents subjected to the weighted superimposing as current frames of the respective displayers.

2. The method according to claim 1, after the current frames are output, the method further comprising:
   determining whether display expires or scrolling display is cancelled; when it is time to terminate current processing, display has not expired and scrolling display has not been cancelled, determining display positions and display contents of the content needing scrolling display in next frames of the respective displayers according to the arrangement manner, the output size and the scrolling display manner of the displayers of the telepresence system, subjecting the content needing scrolling display in the next frames to weighted superimposing respectively with originally to-be-displayed decoded outputted contents of the next frames of the respective displayers to output respective contents subjected to the weighted superimposing as the next frames of the respective displayers.

3. The method according to claim 1, wherein the content needing scrolling display comprises a caption, and/or an image.

4. A multi-displayer scrolling display device in a telepresence system, comprising a processor configured to be capable of executing programmed instructions comprising:

receiving a content needing scrolling display;

determining display positions and display contents of the content needing scrolling display in respective displayers according to an arrangement manner of the displayers of the telepresence system, an output size of the respective displayers of the telepresence system and a scrolling display manner of the content needing scrolling display;

subjecting the content needing scrolling display in the respective displayers to weighted superimposing respectively with originally to-be-displayed decoded and outputted contents of the respective displayers; and outputting respective contents subjected to the weighted superimposing as current frames of the respective displayers.

5. The device according to claim 4, the processor configured to be capable of executing programmed instructions further comprising determineing, after the current frames are outputted, whether display expires or scrolling display is cancelled, and when it is time to terminate current processing, display has not expired and scrolling display has not been cancelled, determining display positions and display contents of the content needing scrolling display in next frames of the respective displayers according to the arrangement manner, the output size and the scrolling display manner of the displayers of the telepresence system;

subjecting the content needing scrolling display in the next frames to weighted superimposing respectively with originally to-be-displayed decoded and outputted contents of the next frames of the respective displayers, and outputting respective contents subjected to the weighted superimposing as the next frames of the respective displayers.

6. The device according to claim 4, wherein the content needing scrolling display comprises a caption, and/or an image.

7. A processing terminal of a telepresence system, comprising a multi-displayer scrolling display device in the telepresence system, wherein the multi-displayer scrolling display device comprise a processor configured to be capable of executing programmed instructions comprising:

receiving a content needing scrolling display;

determining display positions and display contents of the content needing scrolling display in respective displayers according to an arrangement manner of the displayers of the telepresence system, an output size of the respective displayers of the telepresence system and a scrolling display manner of the content needing scrolling display;

subjecting the content needing scrolling display in the respective displayers to weighted superimposing respectively with originally to-be-displayed decoded and outputted contents of the respective displayers; and outputting respective contents subjected to the weighted superimposing as current frames of the respective displayers.

8. The processing terminal of a telepresence system according to claim 7, wherein the processor configured to be capable of executing programmed instructions comprising:

determining, after the current frames are outputted, whether display expires or scrolling display is cancelled, and when it is time to terminate current processing, display has not expired and scrolling display has not been cancelled, determining display positions and display contents of the content needing scrolling display in next frames of the respective displayers according to the arrangement manner, the output size and the scrolling display manner of the displayers of the telepresence system; and subjecting the content needing scrolling display in the next frames to weighted superimposing respectively with originally to-be-displayed decoded and outputted contents of the next frames of the respective displayers, and outputting respective contents subjected to the weighted superimposing as the next frames of the respective displayers.

9. The processing terminal of a telepresence system according to claim 7, wherein the processor configured to be capable of executing programmed instructions comprising: converting the content needing scrolling display into content having a lattice structure before subjecting the content needing scrolling display to weighted superimposing respectively with the originally to-be-displayed decoded and outputted contents of the respective displayers.

10. The processing terminal of a telepresence system according to claim 9, wherein the content needing scrolling display comprises a caption, and/or an image.

* * * * *